US012788040B2

(12) United States Patent
Stephan et al.

(10) Patent No.: US 12,788,040 B2
(45) Date of Patent: Nov. 10, 2026

(54) SWEETENER BLEND COMPRISING THAUMATIN AND ONE OR MORE REBAUDIOSIDE

(71) Applicant: NOMAD BIOSCIENCE GMBH, Munich (DE)

(72) Inventors: Anett Stephan, Halle (DE); Anatoli Giritch, Halle (DE); Yuri Gleba, Berlin (DE)

(73) Assignee: NOMAD BIOSCIENCE GMBH, Munich (DE)

( * ) Notice: Subject to any disclaimer, the term of this patent is extended or adjusted under 35 U.S.C. 154(b) by 100 days.

(21) Appl. No.: 18/683,555

(22) PCT Filed: Aug. 22, 2022

(86) PCT No.: PCT/EP2022/073335
§ 371 (c)(1),
(2) Date: Feb. 14, 2024

(87) PCT Pub. No.: WO2023/021219
PCT Pub. Date: Feb. 23, 2023

(65) Prior Publication Data
US 2024/0349768 A1 Oct. 24, 2024

Related U.S. Application Data

(60) Provisional application No. 63/235,255, filed on Aug. 20, 2021.

(51) Int. Cl.
*A23L 27/30* (2016.01)

(52) U.S. Cl.
CPC ............... *A23L 27/31* (2016.08); *A23L 27/36* (2016.08)

(58) Field of Classification Search
CPC ........................................................ A23L 27/36
See application file for complete search history.

(56) References Cited

U.S. PATENT DOCUMENTS

2010/0267847 A1 10/2010 Yoshinaka et al.
2017/0295827 A1* 10/2017 Prakash .................... A23L 2/60

FOREIGN PATENT DOCUMENTS

| | | | |
|---|---|---|---|
| JP | H08-89207 | A | 4/1996 |
| RU | 2503267 | | 1/2014 |
| WO | 2009/063921 | A1 | 5/2009 |
| WO | 2020128704 | | 6/2020 |

OTHER PUBLICATIONS

Machine translation of RU 2503267, publication date Jan. 10, 2014, pp. 1-5. (Year: 2014).*
Firsov, et al. "Purification and characterization of recombinant supersweet protein thuamatin II from tomato fruit". Protein Expression and Purification, 123, (2016), 1-5. (Year: 2016).*
European Patent Office, International Search Report and Written Opinion for International Patent Application No. PCT/EP2022/073335, Nov. 11, 2022.

(Continued)

*Primary Examiner* — Jenna A Watts
(74) *Attorney, Agent, or Firm* — Williams Mullen; David M. Saravitz

(57) ABSTRACT

The invention provides a sweetener or flavor modifying composition comprising of Thaumatin and at least one Rebaudioside.

19 Claims, 2 Drawing Sheets
Specification includes a Sequence Listing.

(56) References Cited

OTHER PUBLICATIONS

J.C. Fry; "Natural low-calorie sweeteners;" in: Baines, D. and Seal, R., eds., Natural Food Additives Ingredients and Flavourings (Cambridge, UK, Woodhead Publishing, 2012); pp. 41-75.

I. Prakash et al; "Development of Next Generation Stevia Sweetener: Rebaudioside M;" Foods; vol. 3; No. 1; pp. 162-175; Year 2014.

* cited by examiner

SEQUENCE LISTING

```
Sequence total quantity: 4
SEQ ID NO: 1           moltype = AA  length = 207
FEATURE                Location/Qualifiers
source                 1..207
                       mol_type = protein
                       organism = Thaumatococcus daniellii
SEQUENCE: 1
ATFEIVNRCS YTVWAAASKG DAALDAGGRQ LNSGESWTIN VEPGTNGGKI WARTDCYFDD  60
SGSGICKTGD CGGLLRCKRF GRPPTTLAEF SLNQYGKDYI DISNIKGFNV PMNFSPTTRG  120
CRGVRCAADI VGQCPAKLKA PGGGCNDACT VFQTSEYCCT TGKCGPTEYS RFFKRLCPDA  180
FSYVLDKPTT VTCPGSSNYR VTFCPTA                                      207

SEQ ID NO: 2           moltype = AA  length = 207
FEATURE                Location/Qualifiers
source                 1..207
                       mol_type = protein
                       organism = Thaumatococcus daniellii
SEQUENCE: 2
ATFEIVNRCS YTVWAAASKG DAALDAGGRQ LNSGESWTIN VEPGTKGGKI WARTDCYFDD  60
SGRGICRTGD CGGLLQCKRF GRPPTTLAEF SLNQYGKDYI DISNIKGFNV PMDFSPTTRG  120
CRGVRCAADI VGQCPAKLKA PGGGCNDACT VFQTSEYCCT TGKCGPTEYS RFFKRLCPDA  180
FSYVLDKPTT VTCPGSSNYR VTFCPTA                                      207

SEQ ID NO: 3           moltype = AA  length = 207
FEATURE                Location/Qualifiers
source                 1..207
                       mol_type = protein
                       organism = Thaumatococcus daniellii
SEQUENCE: 3
ATFEIVNRCS YTVWAAASKG DAALDAGGRQ LNSGESWTIN VEPGTNGGKI WARTDCYFDD  60
SGSGICKTGD CGGLLRCKRF GRPPTTLAEF SLNQYGKDYI DISNIKGFNV PMDFSPTTRG  120
CRGVRCAADI VGQCPAKLKA PGGGCNDACT VFQTSEYCCT TGKCGPTEYS RFFKRLCPDA  180
```

-continued

```
FSYVLDKPTT VTCPGSSNYR VTFCPTA                                    207

SEQ ID NO: 4            moltype = AA  length = 207
FEATURE                 Location/Qualifiers
source                  1..207
                        mol_type = protein
                        organism = Thaumatococcus daniellii
SEQUENCE: 4
ATFEIVNRCS YTVWAAASKG DAALDAGGRQ LNSGESWTIN VEPGTKGGKI WARTDCYFDD  60
SGSGICKTGD CGGLLRCKRF GRPPTTLAEF SLNQYGKDYI DISNIKGFNV PMDFSPTTRG  120
CRGVRCAADI VGQCPAKLKA PGGGCNDACT VFQTSEYCCT TGKCGPTEYS RFFKRLCPDA  180
FSYVLDKPTT VTCPGSSNYR VTFCPTA                                    207
```

SWEETENER BLEND COMPRISING THAUMATIN AND ONE OR MORE REBAUDIOSIDE

CROSS-REFERENCE TO RELATED APPLICATIONS

This application is the U.S. National Stage of International Application PCT/EP2022/073335, filed Aug. 22, 2022, which designates the U.S. and was published by the International Bureau in English on Feb. 23, 2023, and which claims the benefit of U.S. Provisional Patent Application No. 63/235,255, filed Aug. 20, 2021; both of which are hereby incorporated herein in their entirety by reference.

FIELD OF THE INVENTION

The present invention relates to a low-calorie sweetener or flavor modifying composition having sweetness synergy and improved organoleptic properties comprising Thaumatin, such as Thaumatin II, and one or more of Rebaudioside, such as one or more Rebaudioside A, B, D, E, M, N, or O. The present invention also relates to food and beverage products comprising said sweetener or flavor modifying composition. The invention also relates to a kit-of-parts comprising Thaumatin, such as Thaumatin II, and one or more of Rebaudioside, such as one or more Rebaudioside A, B, D, E, M, N, or O.

BACKGROUND

Most food and beverage products contain nutritive sweeteners such as sucrose (generally referred to as 'sugar' or 'table sugar'), glucose, fructose, corn syrup, high fructose corn syrup and the like, or high intensity sweeteners such as aspartame, sucralose, acesulfame K, saccharin, cyclamates, steviol glycosides and the like. Such sweeteners supply sweetness and a favorable sensory response, for example in terms of flavor balance, quality of sweetness, lack of bitterness and off taste, desirable temporal profile and desirable mouthfeel.

Despite the preferred taste and functional properties provided by nutritive sweeteners like sugar, excess intake of full calorie sweeteners has long been associated with an increase in diet-related health issues, such as obesity, heart disease, metabolic disorders and dental problems. This worrying trend has caused consumers to become increasingly aware of the importance of adopting a healthier lifestyle and reducing the level of nutritive sweeteners in their diet.

Recently there has been a substantial increase in consumer products utilizing replacements for nutritive sweeteners, with a particular focus on the development of low or zero-calorie sweeteners of natural origin. In fact, in North America, the number of new product launches utilizing natural high intensity low calorie sweeteners has increased, outpacing artificially sweetened new product launches, while nutritive sweetened product launches have slowly declined.

An ideal replacement for a nutritive or artificial sweetener is a sweetener that has desirable taste characteristics with fewer calories, can be sustainably produced, has clearly understood metabolism and history of safe use, and is cost effective. Aiming to meet this growing need, the market has been flooded with possible candidates to replace conventional nutritive sweeteners. Unfortunately, however, many of the low or zero calorie replacements offered on the market lack one or all of the necessary characteristics, and often exhibit bitterness or off-taste. Therefore, many of the proposed sweeteners are not an ideal replacement for nutritive sweeteners.

Thaumatin, a protein found in Katemfe fruit, has been well known as a sweetener and flavor modifier. However, as Katemfe fruit is not readily cultivated, sustainability of the thaumatin market is poor and cost is high. Additionally, thaumatin from Katemfe fruit is a mixture of thaumatin proteins, some of which have better organoleptic properties such as thaumatin II, and some which do not have preferred organoleptic properties. This is further complicated as thaumatin from katemfe fruit is a natural product and the ratios of thaumatins are variable in addition to the quality. Furthermore, while thaumatin alone has good taste properties when providing a sweetness equivalent to a 5% solution of sucrose, at higher sweetening concentrations it suffers from off taste properties such as bitter, metallic, or medicinal notes. Recent advances in technology allow the production of thaumatin through transient expression of this protein in well-known agricultural commodity crops which has eliminated the variability, mixed nature, and reduced the cost in use resulting in a readily available source of thaumatin II, which has improved organoleptic properties vs. mixed thaumatins. However, at higher sweetening concentrations, thaumatin II from commodity crop expression still suffers from off taste properties.

Stevia is a well-known sweetener and flavor modifier which contains sweet compounds known as steviol glycosides, such as Rebaudioside (Reb) A, B, D, E, M, N, and O. However, it suffers from high cost in use and off tastes such as metallic, licorice, medicinal, and most notably bitterness when used at higher levels of sweetness. While some of the steviol glycosides such as Reb M and D have improved organoleptic properties and have recently been produced by a variety of biotechnological routes, they still suffer from high cost in use as well as poor solubility at higher levels.

Therefore, there is a need to provide an improved replacement of natural origin for nutritive sweeteners that has low or zero-calories and is without limitations in use, but which also has preferred taste characteristics, is sustainable, has high solubility, and good cost in use.

SUMMARY OF THE INVENTION

The present invention seeks to provide a solution to the above-mentioned problems by providing a sweetener or flavor modifying composition of natural origin, acceptable cost in use, preferred organoleptic properties, history of safe use, and low-calorie content. The present invention also seeks to provide a sweetener or flavor modifying composition having sweetness synergy, a reduction in off tastes or off flavors, desirable temporal profile, when compared with other high intensity sweeteners of natural origin.

The first aspect of the present invention provides a sweetener or flavor modifying composition comprising a Thaumatin, such as Thaumatin II, and one or more Rebaudioside including Reb A, B, D, E, M, N, or O. In a second aspect, the invention provides a sweetener or flavor modifying composition comprising a Thaumatin, such as Thaumatin II, and at least one Rebaudioside. In both aspects Reb A and Reb M or a mixture thereof are preferred. In one embodiment, the Rebaudioside is Reb A. In another embodiment, the Rebaudioside is Reb M. In both aspects, the Thaumatin may be selected from Thaumatin I, Thaumatin II, Thaumatin A, and Thaumatin B, wherein Thaumatin II is preferred. In a preferred embodiment, the Thaumatin is Thaumatin II and the Rebaudioside is Reb A and/or Reb M, preferably Reb A or Reb M.

In one embodiment of the present invention, the sweetener or flavor modifying composition comprises a Thaumatin, such as Thaumatin II, in an amount of about 1% to about 10%, and one or more Rebaudioside from the list of Reb A, B, D, E, M, N, or O in an amount of about 90% to about 99% by weight relative to the total weight of the composition.

In another embodiment, the sweetener or flavor modifying composition comprises Thaumatin, such as Thaumatin II, in an amount of about 3% by weight of the final sweetening composition and one or more Rebaudioside from the list of Reb A, B, D, E, M, N, or O in an amount of about 97% by weight relative to the total weight of the sweetening or flavor modifying composition.

In another embodiment, the sweetener or flavor modifying composition comprises Thaumatin, such as Thaumatin II, in an amount of about 7% by weight of the final sweetening composition and one or more Rebaudioside from the list of Reb A, B, D, E, M, N, or O in an amount of about 93% by weight relative to the total weight of the sweetening or flavor modifying composition.

In some embodiments, the thaumatin portion, preferably the Thaumatin II portion, utilized in the composition is greater than 90% purity relative to the weight of the total thaumatin II portion of the composition.

In some embodiments, the sweetener or flavor modifying composition further comprises another sweet tasting additive, a stabilizing or solubilizing solvent, a bulking agent, a flavoring agent, and/or a stabilizer.

A further aspect of the present invention provides a food or beverage product comprising a sweetener or flavor modifying composition of the invention.

In another embodiment, the sweetener or flavor modifying composition used in the resulting food or beverage product comprises Thaumatin, such as Thaumatin II, at a concentration in the food or beverage product at about 0.2 ppm and 10 ppm, preferably at about 0.2 ppm to 10 ppm, and one or more Rebaudioside from the list of Reb A, B, D, E, M, N, or O at a concentration in the food or beverage product in at about 75 ppm to 750 ppm.

A further aspect of the present invention provides a table-top sweetener comprising a sweetener composition of the invention.

Further aspects of the present invention provide a bulking agent comprising a sweetener composition according to the invention; a coating agent comprising a sweetener composition according to the invention; a cosmetic product comprising a sweetener composition according to the invention; a pharmaceutical product comprising a sweetener composition according to the invention; a nutritional product comprising a sweetener composition according to the invention; and a sports product comprising a sweetener composition according to the invention.

Another aspect of the present invention provides the use of a sweetener or flavor modifying composition according to the present invention in a food product, a beverage product, a pharmaceutical product, a nutritional product, a sports product, or a cosmetic product. Another aspect of the present invention provides the use of the sweetener composition according to the present invention as a bulking agent. Another aspect of the present invention provides the use of the sweetener composition according to the present invention as a coating agent.

In another aspect, the invention provides a kit-of-parts comprising, as a first part, a Thaumatin, preferably Thaumatin II, or a composition comprising said Thaumatin and, as a second part, at least one Rebaudioside or a composition comprising at least one Rebaudioside. The Rebaudioside and preferred Rebaudiosides are as indicated above. The mass ratios of Thaumatin, preferably Thaumatin II, and the Rebaudioside(s) may be as given above for the sweetener or flavor modifying composition.

DETAILED DESCRIPTION

Figure 1:
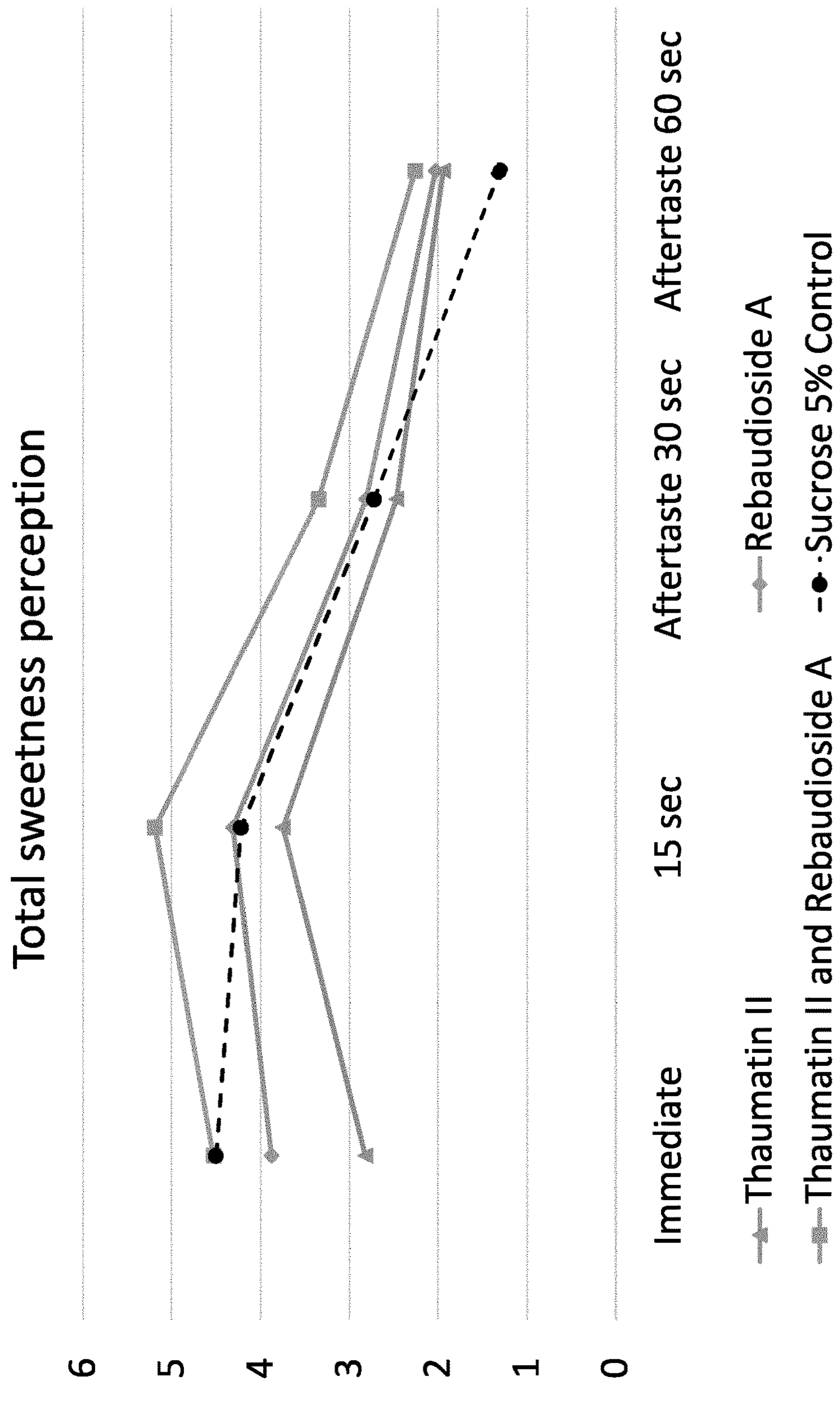
FIG. 1. The graph illustrates the total mean sweet perception for Thaumatin II, Rebaudioside A, and the combination thereof. A 5% sucrose solution in water was used as a sweetness control.

The present invention is based upon the discovery that Thaumatin, notably Thaumatin II, surprisingly has unique characteristics when highly purified from other thaumatins and combined with Rebaudiosides such as Reb A, B, D, E, M, N, and O. Thaumatin exists naturally as several isoforms in Katemfe fruit (*Thaumatococcus daniellii*). Thus, the term Thaumatin is generic and relates to any isoform or mixture of two or more isoforms of Thaumatin. These isoforms have different levels of sweetness, sweet linger and off taste. Thaumatin II is the isoform which has the best quality of sweetness with the fewest negative organoleptic properties. Therefore, Thaumatin II the preferred Thaumatin in the present invention. However, it is difficult to separate or enrich Thaumatin II from the natural Katemfe fruit extract mixture of thaumatin isoforms. However, in the present invention, Thaumatin II with, preferably, a purity of greater than 90% by weight has been utilized as isolated by transient recombinant expression in sustainable agricultural commodity crops. This has the dual benefit of only producing the best isoform Thaumatin II and doing so in a sustainable manner. Transient recombinant expression of Thaumatins, such as Thaumatin II, is known in the art and is, for example, described in WO 2022/012926 A1.

Surprisingly, when Thaumatin, notably Thaumatin II, of purity greater than 90% is combined with one or more Rebaudioside such as Reb A, B, D, E, M, N, or O, the composition has an improved quality of taste and a higher relative sweetness or sweetness synergy. That is to say, the relative sweetness of the sweetener composition is greater than the sweetness calculated from the individual components of the composition and furthermore the negative taste attributes of the individual components are reduced in the final composition, in particular, with regard to the bitter taste and/or undesirable temporal profile that may be associated with the individual components. In addition, due to each of the components contributing near zero calories in use, the sweetener composition is zero or low calorie. Furthermore, as a consequence of the sweetness synergy exhibited by the composition, the amount of the composition required to provide a given level of sweetness is less than would be expected in the absence of synergy, thereby allowing a further reduction in both cost and calories. Thus, the sweetener composition of the present invention provides enhanced sweetness, improves the balance of flavor by reducing off-taste, and provides a more desirable temporal profile, while at the same time allowing a significant reduction in calories and cost compared to a sweet-equivalent amount of a conventional nutritive sweetener or other natural high intensity sweeteners used individually.

Using the sweetener or flavor modifying composition of the present invention allows delivery of an increased sweetness in food or beverage products when compared to the individual components used separately. This enhanced sweetness means that a smaller amount of sweetener can be used in these products, and therefore the cost in use is reduced.

In general terms, the present invention relates to a sweetener or flavor modifying composition comprising the sweeteners Thaumatin, preferably Thaumatin II, and one or more Rebaudioside from the list of Reb A, B, D, E, M, N, or O. Herein, the generic term "Thaumatin" refers to any one or more of Thaumatin isoforms I, II, A, and B. The term "Thaumatin I" refers to an oligopeptide or protein of the following amino acid sequence (SEQ ID NO: 1):

```
ATFEIVNRCSYTVWAAASKGDAALDAGGRQLNSGESWTINVEPGTNGGKI

WARTDCYFDDSGSGICKTGDCGGLLRCKRFGRPPTTLAEFSLNQYGKDYI

DISNIKGFNVPMNFSPTTRGCRGVRCAADIVGQCPAKLKAPGGGCNDACT

VFQTSEYCCTTGKCGPTEYSRFFKRLCPDAFSYVLDKPTTVTCPGSSNYR

VTFCPTA
```

The term "Thaumatin II" refers to an oligopeptide or protein of the following amino acid sequence (SEQ ID NO: 2):

```
ATFEIVNRCSYTVWAAASKGDAALDAGGRQLNSGESWTINVEPGTKGGKI

WARTDCYFDDSGRGICRTGDCGGLLQCKRFGRPPTTLAEFSLNQYGKDYI

DISNIKGFNVPMDFSPTTRGCRGVRCAADIVGQCPAKLKAPGGGCNDACT

VFQTSEYCCTTGKCGPTEYSRFFKRLCPDAFSYVLDKPTTVTCPGSSNYR

VTFCPTA
```

The term "Thaumatin A" refers to an oligopeptide or protein of the following amino acid sequence (SEQ ID NO: 3):

```
ATFEIVNRCSYTVWAAASKGDAALDAGGRQLNSGESWTINVEPGTNGGKI

WARTDCYFDDSGSGICKTGDCGGLLRCKRFGRPPTTLAEFSLNQYGKDYI

DISNIKGFNVPMDFSPTTRGCRGVRCAADIVGQCPAKLKAPGGGCNDACT

VFQTSEYCCTTGKCGPTEYSRFFKRLCPDAFSYVLDKPTTVTCPGSSNYR

VTFCPTA
```

The term "Thaumatin B" refers to an oligopeptide or protein of the following amino acid sequence (SEQ ID NO: 4):

```
ATFEIVNRCSYTVWAAASKGDAALDAGGRQLNSGESWTINVEPGTKGGKI

WARTDCYFDDSGSGICKTGDCGGLLRCKRFGRPPTTLAEFSLNQYGKDYI

DISNIKGFNVPMDFSPTTRGCRGVRCAADIVGQCPAKLKAPGGGCNDACT

VFQTSEYCCTTGKCGPTEYSRFFKRLCPDAFSYVLDKPTTVTCPGSSNYR

VTFCPTA
```

The Thaumatins may be used singly or two or more may be used jointly in the invention. For example, Thaumatin A and Thaumatin B may be used in combination. Alternatively, Thaumatin I and Thaumatin II may be used in combination. Where mixtures of two or more Thaumatins are used, any amounts or ratios with a Rebaudioside refer to the combination of the two or more Thaumatins, unless stated otherwise. However, as Thaumatin II has the most preferred organoleptic properties as a sweetener, Thaumatin II is preferred and the use of Thaumatin II as the sole Thaumatin is most preferred.

The term "Rebaudioside" refers to a sweet molecule with the structure:

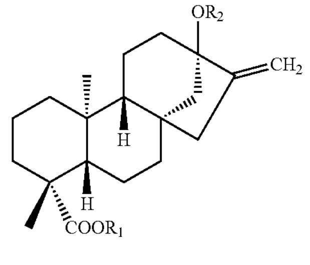

| Name | $R_1$ | $R_2$ |
|---|---|---|
| Rubusoside | Glcß$_1$— | Glcß— |
| Steviolbioside | H | Glcß(1-2)—Glcß$_1$— |
| Dulcoside A | Glcß$_1$— | Rhaα(1-2)—Glcß$_1$— |
| Rebaudioside B | H | Glcß(1-2)[Glcß(1-3)]—Glcß$_1$— |
| Stevioside | Glcß$_1$— | Glcß(1-2)—Glcß$_1$— |
| Rebaudioside C | Glcß$_1$— | Rhaα(1-2)[Gicß(1-3)]—Glcß$_1$— |
| Rebaudioside F | Glcß$_1$— | Xy]β(1-2)[Gicß(1-3)]—Glcß$_1$— |
| Rebaudioside A | Glcß$_1$— | Glcß(1-2)[Glcß(1-3)]—Glcß$_1$— |
| Rebaudioside E | Glcβ(1-2)—Glcß$_1$— | Glcß(1-2)—Glcß$_1$— |
| Rebaudioside M | Glcβ(1-2)[Glcß(1-3)]—Glcβ$_1$— | Glcß(1-2)[Glcß(1-3)]—Glcß$_1$— |
| Rebaudioside D | Glcß(1-2)—Glcß$_1$— | |
| Rebaudioside N | Rhaα(1-2)[Glcß(1-3)]—Gicβ$_1$— | |
| Rebaudioside O | Glcβ(1-3)Rhaα(1-2)[Glcβ(1-3)]—Glcß— | |

The term "temporal profile" of a composition, sugar or sweetener, as used herein, is a measure of the perceived sweetness intensity of said composition, sugar or sweetener over time. A desirable or advantageous temporal profile is one wherein sweetness is observed quickly and has a short linger similar to that of sucrose.

The term "sucrose equivalent value" or "SEV" as used herein refers to the sweetness equivalent of a sweetener related to the sweetness of sucrose. For example, a sweetener at an SEV value of 5 would have a sweetness similar to a 5% by weight solution of sucrose.

The term "low calorie" as used herein refers to a sweetener having 40 calories or fewer per reference amount customarily consumed (RACC) and per labeled serving.

All amounts given in % by weight are quoted on a dry solids (ds) basis unless specifically stated otherwise.

According to an embodiment of the present invention, the sweetener or flavor modifying composition comprises Thaumatin, notably Thaumatin II, in an amount of about 1% to about 10%, and one or more Rebaudioside from the list of Reb A, B, D, E, M, N, or O in an amount of about 90% to about 99% by weight relative to the total weight of the composition. The sweetener or flavor modifying composition makes up between about 0.0001% (1 ppm) to about 0.1% (1000 ppm) by weight of the final food or beverage composition.

Preferably, the sweetener or flavor modifying composition of the invention comprises Thaumatin, preferably Thaumatin II, (preferably >90% purity) in an amount of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%, and a Rebaudioside from the list of A, B, D, E, M, N or O in an amount of about 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, or 99% by weight relative to the total weight of the composition. Preferably, the sweetener or flavor modifying composition would be used in the final food or beverage composition at about 1 ppm, 5 ppm, 10 ppm, 15, ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 150 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, or 1000 ppm by weight of the final food or beverage composition.

In a preferred embodiment of the present invention, the sweetener or flavor modifying composition comprises Thaumatin, preferably Thaumatin II, preferably of greater than 90% purity, in an amount of about 3% (preferably, about 1% to about 5%, or about 2% to about 4%), and combined Rebaudiosides from the list of Reb A, B, D, E, M, N, and/or O in an amount of about 97% (preferably, 95% to about 99%, or about 96% to about 98%) by weight relative to the total weight of the composition.

In an alternative embodiment, the sweetener or flavor modifying composition comprises Thaumatin, preferably Thaumatin II, preferably of greater than 90% purity, in an amount of about 7% (preferably, about 5% to about 10%, or about 6% to about 8%), and combined Rebaudiosides from the list of Reb A, B, D, E, M, N, and/or O in an amount of about 93% (preferably, 90% to about 95%, or about 92% to about 94%) by weight relative to the total weight of the composition.

Advantageously, the sweetener or flavor modifying composition comprises Thaumatin, preferably Thaumatin II, (preferably of a purity greater than 90%) in an amount of about 50% and one or more Rebaudioside from the list of Reb A, B, D, E, M, N or O in an amount of about 50% by percentage of added sweetness in terms of relative sugar equivalent value (SEV). In an alternative embodiment, the sweetener composition comprises Thaumatin, preferably Thaumatin II, (of a purity greater than 90%) in an amount of about 30% and one or more Rebaudioside from the list of Reb A, B, D, E, M, N or O in an amount of about 70% by percentage of added sweetness in terms of relative sugar equivalent value (SEV). In some embodiments, the sweetener composition may further comprise a sweet taste improving additive, a bulking agent, a flavoring agent, and/or a stabilizer.

A further aspect of the present invention provides a food product comprising the sweetener or flavor modifying composition of the invention. Non-limiting examples of a food product include a confectionary product, a dessert product such as yogurt, ice-cream, biscuits, and cakes, a cereal product, baked goods, frozen dairy products, meats, dairy products, condiments, snack bars, soups, dressings, mixes, prepared foods, baby foods, diet preparations, syrups, food coatings, dried fruit, sauces, gravies, jams/jellies, and the like, especially those which are reduced sugar or low sugar products. The food product may be an animal feed product. The food product of the invention may comprise a sweetener composition as a coating or frosting formed on the surface of the product. A coating improves the flavor of the food product as well as its shelf life.

Another aspect of the invention provides a beverage product comprising a sweetener or flavor modifying composition of the present invention. Non-limiting examples of a beverage product include a carbonated beverage, a non-carbonated beverage, fruit-flavored beverage, fruit-juice, tea, milk, coffee especially those which are reduced sugar or low sugar products.

A further aspect of the present invention provides a table-top sweetener comprising a sweetener composition according to the invention.

Another aspect of the present invention provides a bulking agent comprising a sweetener composition according to the invention.

Another aspect of the present invention provides a coating agent comprising a sweetener composition according to the invention.

Another aspect of the present invention provides a pharmaceutical product comprising a sweetener composition according to the invention.

Another aspect of the present invention provides a nutritional or sports product comprising a sweetener composition according to the invention.

Another aspect of the present invention provides a cosmetic product comprising a sweetener composition according to the invention.

It will be appreciated that the amount of a sweetener or flavor modifying composition according to the invention present in a food product, a beverage product, a pharmaceutical product, a nutritional product, a sports product, or a cosmetic product, will depend upon the type and amount of sweetener present in the sweetener composition and the desired sweetness of the food or beverage product.

An alternative aspect of the present invention provides the use of a sweetener or flavor modifying composition according to the invention in a food product, a beverage product, a pharmaceutical product, a nutritional product, a sports product, or a cosmetic product, as a bulking agent or as a coating agent.

The sweetener or flavor modifying composition may be formulated in any physical form, for example, dissolved in a solvent such as water or glycol, as a syrup, in powder form, tablet form, as granules, in a solution or in any other suitable form including beverages and food products.

As outlined in the below examples, the sweetener or flavor modifying composition of the invention exhibits a sucrose equivalent value (SEV) greater than the predicted value based on its individual components. Therefore, the sweetener composition of the present invention displays sweetness synergy.

The following examples are exemplary only and is not intended to be limiting in any way.

Example 1: Demonstration of Sweetness Synergy of the Composition of the Present Invention Round table evaluations were performed with 7 test panelists. Equal sweet 5 SEV concentrations in neutral pH water were made for Thaumatin II (purity greater than 90%), Rebaudioside A, and Rebaudioside M. These equal sweet solutions were also mixed at 50% of Thaumatin II and 50% Reb M or RebA and compared to the individual components. The components of the test compositions are described in the below tables. The mixed compositions were calculated using the Beidler mixture equation for the sweeteners. The Beidler mixture equation for sweeteners is as follows:

$$SEV = \frac{conc \cdot R_{max}}{conc + 1/K}$$

The concentration of each component in the mixture in ppm is divided by SEV (c/R) and is plotted against concentration, c. The slope of the linear regression is the maximum SEV ($R_{max}$). The y-intercept of the linear regression multiplied by $R_{max}$ is the half-maximal sweetness concentration, 1/K. $R_{max}$ and 1/K are the two parameters used in the Beidler equation. Mixtures were tasted in comparison to reference samples for the panelists to determine SEV values. References samples were 3%, 4%, 5%, 6%, 7%, and 8% sucrose in neutral pH water. The test samples were served in 2 ounce soufflé cups (approximately 60 ml) coded with 3-digit codes at room temperature. A two minute wait period between samples was enforced. Water and unsalted crackers was available for the panelists to clear their palates before and during testing. Results were collected for calculating approximate SEV level of each test sample.

The test products analyzed in this experiment are described below in Table 1.

Product Information

TABLE 1

Mean sweetness of Thaumatin II, Reb A, Reb M, and the combinations of Reb A with Thaumatin II and RebM with Thaumatin II.

| Composition | Sweetness intensity determined, SEV |
|---|---|
| 7 ppm Thaumatin II | 4.6 |
| 260 ppm Rebaudioside A | 4.8 |
| 155 ppm Rebaudioside M | 5.3 |
| 3.5 ppm Thaumatin II/ 130 ppm Rebaudioside A | 5.8 |
| 3.5 ppm Thaumatin II/ 77.5 ppm Rebaudioside M | 5.6 |

Surprisingly combinations of Thaumatin II and Rebaudiosides provided sweeter solutions than the individual components would suggest.

Example 2: Qualitative Analysis of Individual Sweeteners and Mixtures Thereof Round table evaluations were performed with 7 test panelists. Equal sweet 5 SEV concentrations in neutral pH water were made for Thaumatin II (purity greater than 90%), Rebaudioside A, and Rebaudioside M. These equal sweet solutions were also mixed at 50% of Thaumatin II and 50% Reb M or RebA and compared to the individual components. All solutions were coded and blinded from panelists. Panelists were asked to provide a qualitative assessment on a scale of 1-10 of the quality of sweetness (10 being the highest quality of sweetness) and undesirable attributes (10 being most undesirable) of each solution using a 5% sucrose and 500 ppm RebA solutions as controls. For the quality of sweetness, the score 10 was assigned to 5% sucrose. Vice versa, the score 1 was assigned to and 500 ppm RebA. For undesirable attributes, the scores 10 and 1 were assigned to 500 ppm RebA and 5% sucrose, respectively. 5% sucrose had the sweet taste without any off notes. In contrast, 500 ppm RebA had a very strong artificial off taste.

TABLE 2

Mean taste quality of Thaumatin II, Reb A, Reb M, and the combinations of Reb A with Thaumatin II and RebM with Thaumatin II.

| Sample | Quality of sweetness (higher better) | Off taste (lower better) | Comments |
|---|---|---|---|
| 7 ppm Thaumatin II | 6.5 | 4.7 | delayed onset, sweet aftertaste |
| 260 ppm Reb A | 5.6 | 6.7 | pronounced artificial off taste |
| 155 ppm Rebaudioside M | 8.8 | 2.5 | clean sweetness, very minor off taste |
| 3.5 ppm Thaumatin II/ 130 ppm Rebaudioside A | 6.2 | 5.3 | artificial off taste is milder |
| 3.5 ppm Thaumatin II/ 77.5 ppm Rebaudioside M | 7.6 | 3.6 | rapid onset, slight sweet aftertaste |

Surprisingly, mixtures of Thaumatin II and RebA had significantly better quality of sweetness and reduced off taste. Thaumatin II masked artificial off taste of RebA; RebA compensated delayed sweetness offset of Thaumatin II. Mixtures of Thaumatin and Reb M had even more pronounced improvements in sweet taste quality and reduced off taste. RebM itself has very mild artificial off taste. Thaumatin II/RebM mix has a sweet taste without delayed offset and almost no artificial off taste. The character of sweetness for this mix is very close to those of sucrose.

Example 3: Analysis of Total Sweet Perception for Thaumatin II, Rebaudioside A and their Mixture Recombinant Thaumatin II was purified from *Nicotiana tabacum* plants transgenic for ethanol-inducible replicon of Tobacco Mosaic Virus carrying Thaumatin II coding sequence. Thaumatin II expression was achieved by spraying plants with diluted ethanol solution. Thaumatin II protein was purified from plant biomass using column chromatography. The details of upstream and downstream processes are described in WO 2022/012926 A1.

7 ppm recombinant Thaumatin II and 260 ppm Rebaudioside A (Sigma, 01432-10G) water solutions as well as both of them mixed together in the half-concentrations (3.5 ppm Thaumatin II/130 ppm Rebaudioside A) were analysed for the total sweet perception. 5% sucrose solution was used as a sweetness control. Flavor and aftertaste were assessed by 8 members of the trained sensory panel of Brisan Group (Orland Park, IL, USA) trained in the Spectrum descriptive methodology. The strength of each attribute was rated on the 15-point Spectrum Scale, where 0=none and 15=very strong. Products were evaluated at room temperature. Products were blinded with 3-digit codes and randomized. Breaks were given in between samples to reduce fatigue. All references were available to panelists to determine intensity scores. Flavour and aftertaste data was collected as individual data. All samples were expectorated. Samples were presented blind in a monadic sequential balanced design. Two replications of sample data were collected.

Panelists evaluated the total sweetness intensity immediately after starting the exposure to test solutions (0-5 seconds in the mouth) and at 15 seconds while the product was still in the mouth. Panelists also evaluated the aftertaste of products 30 seconds and 60 seconds after evaluating the product in mouth (after the expectoration).

To analyse the immediate sweet perception, panelists evaluated the sweet intensity immediately after taking a sip of the solution (evaluated within 0-5 seconds). The total sweetness of products was defined as a sum of the sweet basic taste and high intensity sweetener aromatic attribute. The sweet basic taste was defined as the taste on the tongue stimulated by sucrose and other sugars, such as fructose, glucose, etc. High intensity sweetener aromatic was defined as the light aromatic that is inherent with any non-sucrose sweetener, such as Aspartame, Ace-K, Reb A, Stevia, and Sucralose.

FIG. 1 summarizes the data on the total mean sweet perception for Thaumatin II, Rebaudioside A, and the combination thereof. An increase in the total sweetness was found for the mix compared to individual components. This data supports the synergistic effect between Thaumatin II and RebA. Moreover, the sweetness onset for the mix was less steep than for Thaumatin II used alone, which is indicative for the improvement of Thaumatin II sweetness quality.

Figure 2:
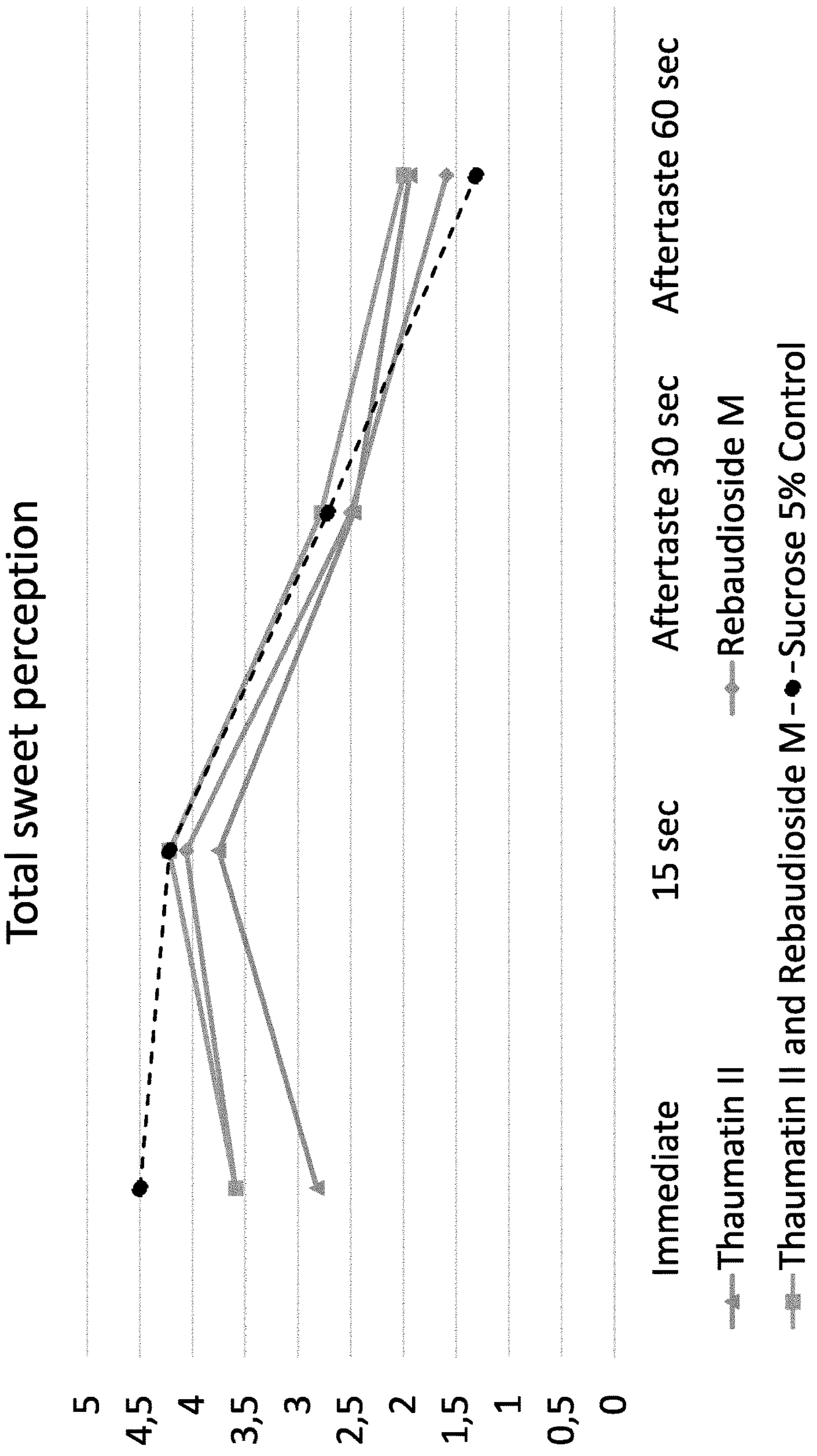
FIG. 2. The graph illustrates the total mean sweet perception for Thaumatin II, Rebaudioside M, and the combination thereof. A 5% sucrose solution in water was used as a sweetness control.

Example 4: Analysis of Total Sweet Perception for Thaumatin II, Rebaudioside M and their Mixture 7 ppm recombinant Thaumatin II and 155 ppm Rebaudioside M water solutions as well as both mixed together in the half-concentrations (3.5 ppm Thaumatin II/77.5 ppm Rebaudioside M) were analysed for the total sweet perception. The study was performed as described in the Example 3. FIG. 2 summarizes the data on the total mean sweet perception for Thaumatin II, Rebaudioside A, and the combination thereof.

Again, an increase in the total sweetness was found for the mixture if compared to individual components. Such increase reflects the sweetness synergy between Thaumatin II and Reb M. Moreover, no delayed sweetness perception which is typical for Thaumatin II was found for the mix, which is a clear indication for the sweetness quality improvement.

CONCLUSIONS

A sweetener or flavor modifying composition according to the present invention exhibits a significant sweetness synergy in addition to a substantial improvement in taste quality and concomitant reduction in undesirable organoleptic properties. Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A sweetener or flavor modifying composition comprising Thaumatin II and at least one Rebaudioside, wherein the Thaumatin II is present in an amount of about 2% to about 5% and the Rebaudioside is present in an amount of about 95% to about 98% by weight relative to the combined weight of the Thaumatin II and Rebaudioside components of the composition.

2. The sweetener or flavor modifying composition according to claim 1, whereas the Thaumatin II is not isolated from *Thamautococcus Daniellii.*

3. The sweetener or flavor modifying composition according to claim 1, whereas the Rebaudioside is selected from the list of Reb A, B, D, E, M, N, or O.

4. The sweetener or flavor modifying composition according to claim 1, whereas the Thaumatin II is present in an amount of about 3% and the Rebaudioside is present in an amount of about 97% by weight relative to the combined weight of the Thaumatin II and Rebaudioside components of the composition.

5. The sweetener or flavor modifying composition according to claim 1, whereas the Thaumatin II is present in an amount of about 3% and Rebaudioside M is present in an amount of about 97% by weight relative to the combined weight of the Thaumatin II and Rebaudioside components of the composition.

6. The sweetener or flavor modifying composition according to claim 1, whereas the Thaumatin II is present in an amount of about 2% and Rebaudioside A is present in an amount of about 98% by weight relative to the combined weight of the Thaumatin II and Rebaudioside components of the composition.

7. A sweetener or flavor modifying composition consisting of Thaumatin II and at least one Rebaudioside, wherein the Thaumatin II is present in an amount of about 2% to about 5%, and the Rebaudioside is present in an amount of about 95% to about 98% by weight relative to the combined weight of the Thaumatin II and Rebaudioside components of the composition.

8. The composition according to claim 7, wherein the Rebaudioside is selected from the list of Reb A, B, D, E, M, N, or O.

9. The composition according to claim 8, wherein the Thaumatin II is present in an amount of about 3% and the at least one Rebaudioside is present in an amount of about 97% by weight relative to the combined weight of the Thaumatin II and Rebaudioside components of the composition.

10. The composition according to claim 7, wherein the Thaumatin II is present in an amount of about 3% and Rebaudioside M is present in an amount of about 97% by weight relative to the combined weight of the Thaumatin II and the Rebaudioside M of the composition.

11. The composition according to claim 7, wherein the Thaumatin II is present in an amount of about 2% and Rebaudioside A is present in an amount of about 98% by weight relative to the combined weight of the Thaumatin II and the Rebaudioside A of the composition.

12. A composition comprising or consisting of Thaumatin II and Rebaudioside A, or comprising or consisting of a Thaumatin II, and Rebaudioside M, wherein the Thaumatin II is present in an amount of about 2% to about 5% and the Rebaudioside is present in an amount of about 95% to about 98% by weight relative to the combined weight of the Thaumatin II and Rebaudioside components of the composition.

13. A method of manufacturing a reduced-calorie product comprising adding the composition according to claim 1 to a food product, a beverage product, a pharmaceutical product, a nutritional product, a sports product, or a cosmetic product.

14. A food, beverage, nutritional product, cosmetic product, or pharmaceutical product comprising adding the sweetener or flavor modifying composition of claim 1 at a use level between about 1 ppm and about 1000 ppm.

15. A food, beverage, nutritional product, cosmetic product, or pharmaceutical product comprising adding the sweetener or flavor modifying composition of claim 1 at a use level of about 500 ppm.

16. A food, beverage, nutritional product, cosmetic product, or pharmaceutical product comprising adding the sweetener or flavor modifying of claim 1 at a use level of about 50 ppm.

17. A kit-of-parts comprising a composition, wherein the composition comprises Thaumatin II and at least one Rebaudioside, wherein the Thaumatin II is present in an amount of about 2% to about 5%, and the Rebaudioside is present in an amount of about 95% to about 98% by weight relative to the combined weight of the Thaumatin II and Rebaudioside components of the composition.

18. The sweetener or flavor modifying composition according to claim 1, wherein the purity of Thaumatin II is greater than 90% purity.

19. The sweetener or flavor modifying composition according to claim 1, consisting of said Thaumatin II and said Rebaudioside.

* * * * *